United States Patent Office 3,311,545
Patented Mar. 28, 1967

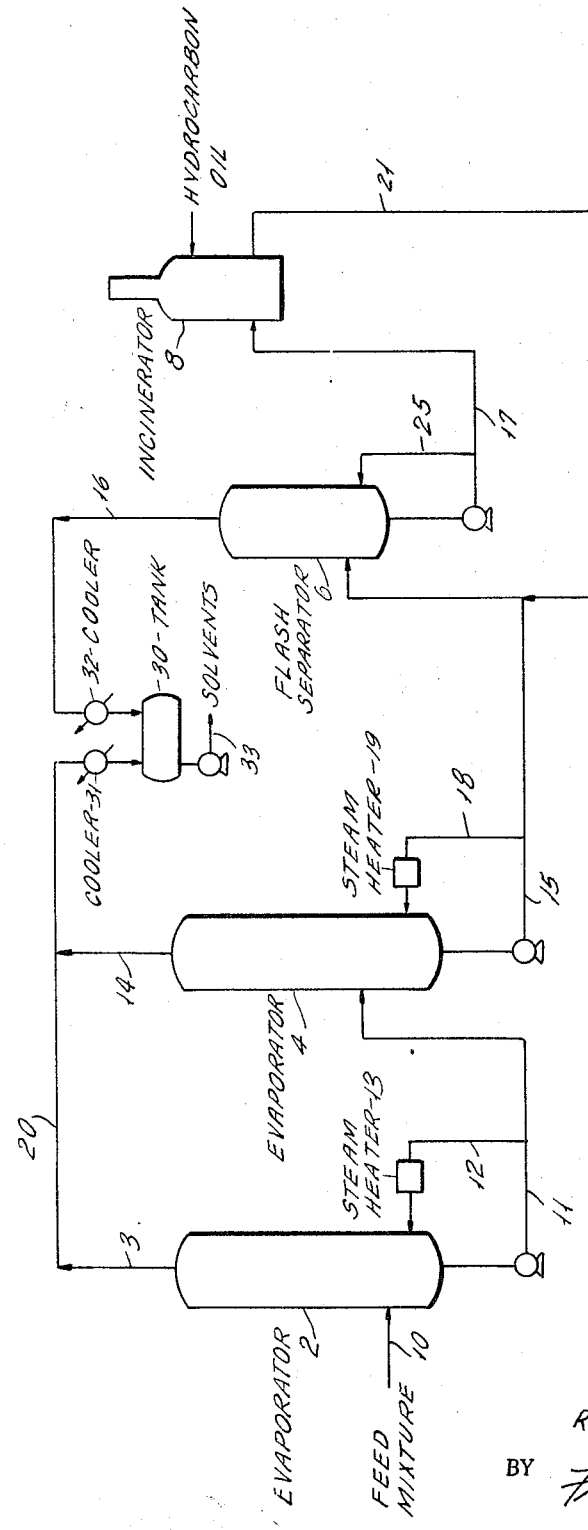

3,311,545
CONTACT OF HYDROXYL COMPOUND CONTAINING POLYMERIZATION CATALYST WITH HEATED HYDROCARBON OIL
Ray Richard Rasmussen, El Paso, Tex., assignor to El Paso Natural Gas Products Company, El Paso, Tex., a corporation of Texas
Filed June 27, 1963, Ser. No. 291,008
4 Claims. (Cl. 203—41)

This invention relates to a novel method for recovering solvents from polymer compositions containing inorganic solids. More particularly, the invention pertains to a novel method for recovering the solvent components of a mixture containing solvents, polymers, and catalyst-residue impurities.

In various processes for the synthesis of polymeric products from ethylene, propylene, and other olefinic compounds or admixtures thereof, the reaction product contains metal particles or residues which cannot be readily separated from the solid polymeric product by physical means. These metal residues result from the use of heavy organometallic catalysts in the polymerization processes. In the preparation of polyethylene and polypropylene, for example, such catalysts have included mixtures of aluminum or lithium aluminum alkyls and titanium or zirconium halides, especially the tetrachlorides and trichlorides. A more detailed description of the catalyst systems will be set forth below.

Regardless of the particular organometallic catalyst system employed, the polymer product, after being separated from the polymerization reaction product mixtures, has been found to contain deleterious amounts of metallic catalyst residues. These residues are somehow attached to the polymer chains and, consequently, are difficult, if not impossible, to separate from the polymer product by physical means. The presence of these catalyst residues tends to make the polymer product become easily discolored and unstable when stored in the presence of air or when heated in certain commercial applications. The presence of the catalyst residues in the polymer products is not readily detected since the latter are generally recovered from the various polymerization processes with a pure white color indicative of high purity.

The desirability of removing the catalyst residues from the polymer product has been recognized by the art for some time, and various chemical means to accomplish this separation can be found in the literature and patents concerning polyolefin polymer processing. One of the more successful methods which has recently been proposed is set forth in U.S. Patent No. 2,962,488, which issued on Nov. 29, 1960. As noted in this patent, if the residues of the heavy metal-organometallic catalysts in the polymerization reaction product mixtures are exposed to oxygen, they are rapidly oxidized to insoluble, colorless products comprising, at least in part, metal oxides or other complex oxidized products of the heavy metals. These oxidized, insoluble catalyst residues precipitate on the polymer and are difficult to separate therefrom. In accordance with the invention disclosed and claimed in U.S. Patent No. 2,962,488, it was found that if the polymerization reaction product mixture is treated with an alcohol in an inert, oxygen-free, water-free atmosphere, the polymerization is terminated and the catalyst residues are converted to an inactive, more soluble form, which can be readily separated from the polymer product. It was further found by the patentee that the catalyst residues thus treated with alcohol are not as readily oxidized, and any subsequent treatment of the polymerization reaction product mixture, such as recovery of the polymer, can be carried out in air.

The use of an alkanol or a hydroxyl-containing compound for treating the polymerization reaction product mixtures containing catalyst residues is also disclosed in U.S. Patent No. 3,012,023, which issued on Dec. 5, 1961. In accordance with the teachings of this patent, the titanium or zirconium metal residues, for example, are converted to esters which are easily dissolved. The polymer product, on the other hand, remains in solid form and can be recovered in purified form merely by filtration or by other known physical separation techniques.

The hydroxyl-containing compounds disclosed by the prior art as operable include water and alkanols having from about 1 to 8 or more carbon atoms per molecule such as methanol, ethanol, propanol, isopropanol, n-butanol, isobutanol, pentanols, hexanols, heptanols, octanols, etc. and mixtures of these with hydrocarbons such as aliphatic normally liquid paraffins. Polyhydroxy compounds such as glycols, ethylene and polyethylene glycols, glycerine, etc. are also useful.

In general, the amount of hydroxyl compound employed will be at least sufficient to solubilize all of the catalyst residue present in the polymerization reaction product mixture. The use of excess reactant is, however, preferred and the amount may actually vary up to 4 or 5 or more times the stoichiometric quantities.

As disclosed above, the polymer product is separated from the reaction product mixture following treatment with the hydroxyl-containing compound by a centrifuge or filtration step, for example. The resulting filtrate will contain excess hydroxyl-containing compound, liquid hydrocarbons, solubilized catalyst residues, some polymer product or by-products which may remain in the solution, and the hydrocarbon reaction medium, if employed during the polymerization reaction. It has been found, for example, that, in the preparation of polypropylene, atactic or waxy polymers will be present in the solution whereas the desired isotactic polypropylene product is generally in solid form and is readily recovered. The inert hydrocarbon solvent or reaction medium employed in the polymerization process includes materials such as xylene, toluene, benzene, hexane, heptane, isooctane, decane, decalin, mixtures thereof, as well as liquefied normally gaseous $C_3$ to $C_5$ hydrocarbons, etc.

Hydrocarbon materials can also be in the filtrate as a result of utilizing a combination of hydroxyl-containing compounds and a hydrocarbon such as an alkane, for "deashing" the metallic catalyst residues from the polymer product. In a recently proposed process, the combination of isopropanol and n-heptane was found to give exceptionally good results in the removal of the catalyst residues present in polypropylene reaction products prepared in accordance with the processes described in the preceding paragraphs.

The present invention will be described below primarily, for purpose of convenience, in terms relating to the treatment of polypropylene products and, more particularly, with respect to treatment of the filtrates or solutions recovered following contact between the polypropylene reaction product mixture with a hydroxyl-containing compound alone or in combination with a hydrocarbon such as n-heptane or other alcohol-hydrocarbon compositions which may be azeotropes or compositions approaching azeotropes.

It will be obvious that an important aspect of the treatments described above involves means for recovery and reuse of the hydroxyl-containing compound and the hydrocarbon from the filtrate or solution following separation of the solid polymer product therefrom. In the absence of an effective and economical method of recovering these materials from the solution, the deashing process might very well prove to be too costly in view of the materials cost and operating steps required.

U.S. Patent No. 3,012,023 discloses a process which subjects the filtrate containing the solubilized inorganic constituents, i.e. catalyst residues, to oxidation with oxygen to convert the inorganic constituents to insoluble materials, which can then be separated from the components. It has been found, however, that this method is not only time consuming and costly, but also requires an elaborate recovery process to provide purified materials which are suitable for recycling.

It has also been proposed to recover the treating agents or solvents by merely subjecting the filtrate or solution containing the solubilized catalyst residues to concentration in a forced circulating evaporator while recovering overhead the volatiles, i.e. the hydroxyl-containing compound and hydrocarbon. In the polypropylene recovery process, as described above, where a mixed solvent combination of isopropanol and n-heptane was employed for deashing the polymer, the concentration method proved to be inadequate for recovering overhead large amounts of the volatiles even though the total contained solids were concentrated up to 60% by weight. Apparently the presence of polypropylene polymer in the solution made it impossible to recover a high percentage of the volatiles by this method.

One object of this invention is to provide a method for readily recovering treating agents and solvents from the filtrate or solution separated from solid hydrocarbon polymer products which have been deashed or freed from inorganic solids or catalyst residues.

Another object of this invention is to provide a method for recovering a hydroxyl-containing compound and an inert hydrocarbon, or an inert hydrocarbon alone, from a solution comprising such materials, solubilized inorganic solids, and polymeric material.

Still another object of this invention is to provide a method for recovering volatile components from a solution containing solubilized inorganic solids and polymeric materials such as polypropylene or polyethylene.

A further object of this invention is to provide a method for recovering isopropanol and n-heptane from solutions obtained by employing this mixture in the deashing of polypropylene.

These and other objects of the invention will become apparent from the ensuing description.

In its most general aspect, the invention comprises contacting the above described filtrate or solution containing the volatile treating agents or solvent mixtures with a hot hydrocarbon oil which liberates its sensible heat and promotes vaporization of the volatile components from the filtrate or solution. In practice, it is preferred to first concentrate the feed solution, which may initially contain less than 5% by weight of total solids, to a total solids concentration ranging from about 20 to 65% by weight, and preferably from about 45 to 60% by weight, prior to treatment with the hydrocarbon oil. The exact manner of contacting the heated hydrocarbon oil and the concentrated feed solution is not particularly critical, and numerous conventional procedures may be employed without departing from the intended scope of this invention. One such contact method found to be quite useful involves injecting the heated hydrocarbon oil into a stream of the feed solution, and the resulting mixture passed to an evaporation zone, e.g. a flash evaporator, wherein the volatile components are vaporized and collected overhead. By operating in accordance with the method of this invention, it has been found that a very high percentage of the solvent or solvent mixture is recovered from the feed solution, and the recovered compounds are in substantially purified form. It will be understood, however, that the recovered solvent or solvent mixture can be further purified, if this is desired, prior to being recycled to earlier stages in either the recovery steps or in the polymerization reaction process or treatment of the polymer product to effect deashing.

The hydrocarbon oil containing the solids, some volatile components, solubilized impurities, and any polymeric material originally present in the feed solution can be removed from the separation or evaporation zone following vaporization of the volatile components and passed to a hold tank for disposal. In accordance with one method of practicing the present invention, the impurity-containing hydrocarbon oil is passed to an incinerator for final disposal. As more particularly pointed out below in some detail, the heat resulting from burning the hydrocarbon oil containing the aforementioned impurities can be employed to preheat the hydrocarbon oil to an elevated temperature prior to contact with the feed solution. This may be accomplished, for example, by positioning a portion of the hydrocarbon oil feed line in direct or indirect heat exchange with the equipment, e.g. incinerator, employed for disposing or burning of the hydrocarbon oil containing the impurities removed from the feed solution. It will be understood, however, that other means may be utilized for disposing of the impurity-containing hydrocarbon oil as well as for preheating the hydrocarbon oil.

The feed mixture, which has been treated in accordance with the method of this invention as discussed above, comprises the solution or filtrate recovered after the deashing and separation of polyolefin polymers. The feed mixture will contain a major proportion of a hydroxyl-containing compound, preferably a relatively low-molecular weight alkanol, solubilized metallic impurities, inorganic and organic solids, and, generally a hydrocarbon solvent.

The metallic or inorganic impurities present in the feed mixture are the so-called catalyst residues, which have been separated from the polyolefin product by treatment with the hydroxyl-containing compound alone or in combination with a hydrocarbon solvent. The polymerization catalysts, from which these residues are derived, include those which have been employed in the art to prepare such polymers as polyethylene, polypropylene, higher alpha olefin polymers, and copolymers. Detailed lists of operable heavy organometallic catalysts are set forth in U.S. Patents No. 2,962,488 and 3,012,023. The preferred catalysts are, however, prepared from alkyl aluminum compounds such as dialkyl-aluminum monohalides, triethyl aluminum, triisobutyl aluminum or trioctyl aluminum with a titanium or zirconium compound such as the tetrachloride or trichloride. It will be understood, however, that the exact composition of the catalyst residues in the feed mixture is not critical for the present purposes.

It was also found that the mixture will contain varying proportions of polymeric product which were dissolved in the treating agents employed in deashing. In such a feed mixture obtained from the deashing of polypropylene with a combination of isopropanol and n-heptane, the presence of atactic polypropylene was detected. The presence of undissolved polymer, i.e., isotactic polypropylene, was also detected in the filtrate or solution from the polymer separation process. At any rate, the method of this invention is still applicable regardless of whether or not the feed mixture contains any dissolved or undissolved polymeric material.

The hydrocarbon oil useful in carrying out the recovery method of this invention may be a relatively heavy molecular weight oil obtained from petroleum. It is preferable that this oil be a heavy aromatic oil which will exhibit greater thermal stability and flow properties. In general, the oil will have a boiling point within the range of about 300° to 800° F., preferably about 400° to 700° F. and an API gravity value of about 1 to 4 degrees. Preferably, the hydrocarbon oil is one which has previously been subjected to a temperature of about 800° to 1100° F. It will be understood that the hydrocarbon oil useful in this invention may be a single hydrocarbon possessing a particular boiling point or a mixture of hydrocarbons characterized by a boiling range. Inpractice, the economically preferable hydrocarbon oils will be those with a boiling range. Such oils may be derived, for example, from various crudes such as those which are aromatic based and from the heavy gas oil, fuel oil, adsorption oil fractions, etc. It is also possible to obtain these heavy hydrocarbon oils by cracking residual oils recovered from a refining operation such as topping. Obviously the hydrocarbon oil used must be relatively inexpensive as compared to the solvents or volatiles being recovered.

In practicing the inventive method, it has been found particularly desirable to initially subject the feed mixture to a concentration step wherein the total solids concentration, usually less than about 5% by weight, is raised to a level of about 20 to 65%, preferably about 45 to 60% by weight. The concentration may be carried out in conventional equipment such as an evaporator which is treated to temperatures required dependent upon the nature of the volatile components contained in the feed stream and also upon the desired pressure of the equipment being used. In a feed stream containing isopropanol and n-heptane as volatile components, the concentration of solids can be effected by heating the evaporator bottoms materials to at least 170° F. and preferably from about 172° to 195° F. The volatiles are condensed and collected and may be either recycled directly or subjected to an intermediate purification treatment, if necessary. This initial concentration of the feed mixture may either be carried out in a single concentration step or by employing a number of sequential steps to facilitate handling, etc.

After being concentrated to the desired level, the feed mixture is next contacted with the heavy hydrocarbon oil described above. The amount of hydrocarbon oil employed will, in general, be at least equal in weight to that of the total contained solids, although the exact amount is not considered to be critical and a lesser amount may be utilized, provided it is sufficient to permit the outstanding recoveries of volatile materials from the feed mixture achieved by practicing the method of this invention. The hydrocarbon oil is heated to a temperature great enough to allow total vaporization of all solvents contained in the feed and to supply sufficient sensible heat to the contained solids to heat them above 190° F. and preferably from 200° F. to about 300° F. The heated oil is then introduced into the feed mixture to allow the necessary exchange of heat. The volatiles can be substantially totally recovered overhead, leaving the impurities and the hydrocarbon oil as residues. In accordance with the preferred method of carrying out the invention, the heavy hydrocarbon is preheated to a temperature of about 300° to 700° F. and preferably about 400° to 600° F., prior to being contacted with feed mixture. By operating in this manner, the sensible and latent heat contained in the hydrocarbon oil serves to vaporize the volatiles almost instantaneously in, for example, a flash evaporator.

Following removal of the volatiles, the hydrocarbon oil mixture containing the aforementioned impurities can be disposed of in the most economical manner available. As previously discussed, the hydrocarbon oil mixture may be burned in an incinerator to supply the heat required to raise the temperature of the hydrocarbon oil feed to the desired level, prior to contact with the feed mixture. This particular operation is another obvious advantage of the recovery method of this invention.

For a more complete understanding of the invention, reference will now be made to the schematic drawing which is one form of the apparatus wherein the recovery method may be carried out. However, it will readily be apparent that this particular method of operation may be widely varied without departing from the spirit and scope of the invention as defined in the appended claims.

With particular reference to the drawing, there is provided a first stage evaporator 2, a second stage evaporator 4, a flash separator 6, and an incinerator 8, each of which may comprise equipment that is well known in the art for evaporation, separation and incineration.

In accordance with this invention, the feed mixture is considered as that derived from treating or deashing a polypropylene reaction product. The polymer product, from the polymerization of propylene in the presence of an aluminum alkyl and titanium trichloride, is treated with a combination of isopropanol and n-heptane and the resultant solution or filtrate is passed via line 10 to the lower portion of the first stage evaporator 2, which is operated at a pressure of about 5 p.s.i.g. The feed mixture is heated in a circulating reboiler 13, to a temperature of about 170° to 190° F., and concentrated from about 0.5 to 2% total solids to about 10% total solids. The isopropanol and n-heptane, hereinafter referred to either as the solvents or volatiles, are removed overhead via lines 3 and 20 to tank 30. The bottoms from the first stage evaporator 2, is recycled via line 12 and heater 13 into the lower section of the first stage evaporator 2. The recycled portion of the bottoms is heated to a temperature of about 175° to 190° F. A portion of the bottoms from the first stage evaporator 2 is pumped via line 11 into the lower section of second stage evaporator 4. Sensible and latent heat requirements for the desired volatilization is supplied by heater 13. In the second stage evaporator 4, the feed mixture is subjected to a temperature of about 185° F. to 195° F. by circulation through line 18 and heater 19, and additional isopropanol and n-heptane are recovered overhead via lines 14 and 20 into tank 30, while the feed mixture is concentrated to about 45 to 65% total solids. The thus concentrated feed mixture is removed from the bottom of the second stage evaporator and pumped via line 15 into flash separator 6 after being mixed with a hydrocarbon oil heated to a temperature of about 500° to 600° F.

In flash separator 6, the remaining isopropanol and n-heptane are flashed overhead and passed through line 16 into tank 30. The bottoms from flash evaporator 6 may be circulated via line 25 to the lower section thereof to ensure as high a recovery of the solvents as possible. The bottoms from flash separator 6, which contain the hydrocarbon oil and the residual feed mixture, are removed via line 17 and pumped into incinerator 8 where they are burned at a temperature of about 1000° to 1300° F.

As shown in the drawing the hydrocarbon oil is heated by indirect heat exchange in incinerator 8 to about 500° to 600° F. and is then fed to the recovery system via line 21. There it is combined with the bottoms product from the second stage evaporator 4 and enters flash separator 6 via line 15. In accordance with one of the preferred methods of carrying out the invention, the hydrocarbon oil feed has a boiling-point range of about 500° to 700° F., and API gravity of about 1 to 4 degrees, and in addition, has previously been subjected to a temperature of at least about 800° F. The latter can occur, for example, during one or more of the conventional thermal or cracking steps known in the petroleum art.

In further reference to heaters 13 and 19, steam under pressure is used to heat the recycled portions of the bottoms to the aforementioned temperatures. Coolers 31 and 32, on the other hand, are supplied with water to lower the temperature of the recovered solvent stream to about 100° F. to effect condensation. The liquid isopropanol and n-heptane collected in tank 30 may be removed via line 33 and recycled to the deashing operation (not shown) directly or after subjecting them to a conventional purification treatment (not shown) in the event that they are slightly contaminated with the hydrocarbon oil.

It will be apparent from the foregoing description that a continuous method has been shown to remove solvents from the above described feed mixture. Obviously, the initial concentration of the feed mixture to the 20 to 65% total solids level may be effected in a single stage evaporator or, if desired, more than two evaporators may be utilized to attain gradually the desired concentration level.

All of the foregoing percentages are by weight unless otherwise indicated, and a weight of the hydrocarbon oil about equal to the total weight of contained solids is admixed with feed mixture prior to passage into flash separator 6 in order to obtain the desired degree of solvent removal. Pressures employed in the first and second stage evaporators will generally be about 1 to 15 p.s.i.g., and similar pressures will be used in flash separator 6.

The following example will serve to illustrate further the method of this invention. It is, however, also intended for purposes of illustration and not necessarily of limitation.

*Example*

In the apparatus shown in the drawing, a feed mixture having the following composition was passed into the second stage evaporator 4.

| Component: | Percent by weight |
| --- | --- |
| Isopropanol | 44.8 |
| n-Heptane | 44.9 |
| Total solids | 10.3 |
| Polymeric material | 7.4 |

Feed mixtures of the above composition were initially charged to a desirable level in a forced circulation evaporator. Circulation of the mixture was maintained through the evaporator at a tube velocity of 6 to 8 feet per second. Steam was supplied to the shell of the evaporator at 86 p.s.i.g. The condenser pressure was maintained at atmospheric pressure. The evaporator had a surface area of 2.8 square feet. The feed mixture was introduced continuously at a rate of 332 pounds per hour to maintain a constant product inventory and a constant product composition.

Conditions maintained during the run are:

| | |
| --- | --- |
| Steam pressure _____p.s.i.g__ | 86 |
| Temperatures: | |
| Inlet to evaporator _____° F__ | 176 |
| Outlet from evaporator _____° F__ | 185 |
| Feed to flash drum _____° F__ | 80 |
| Vapor to condenser _____° F__ | 173 |
| Condenser pressure _____p.s.i.g__ | 0 |
| Total solids of feed _____wt. percent__ | 10.3 |
| Total solids of product _____wt. percent__ | 60.0 |

In accordance with the inventive method, a feed mixture was contacted with hot hydrocarbon oil. The feed mixture contained 21.4% total solids by weight and the remaining component was a 1:1 by weight mixture of isopropanol and n-heptane. The hydrocarbon oil used was a heavy aromatic having an API gravity of 2° and a boiling range of from 450° to 725° F.

A 99% by weight recovery of the isopropanol-heptane solvent mixture was realized. To obtain this high degree of recovery, the flash chamber bottoms product was maintained at a 51.4% by weight of solids in the heavy hydrocarbon oil. The bottoms product temperature was observed at 230° F. while the overhead vapor temperature was recorded at 180° F. It was observed that the bottoms temperature rose very rapidly from about 200° F. up to temperatures as high as 482° F. This additional information was significant in that it supported other data by indicating the low residual amounts of the lower boiling components, i.e., isopropanol and n-heptane.

Further testing was carried out in a laboratory distillation column where a reflux ratio of 2:1 could be maintained. The condensed overhead product was water-white and had no odor typical of that of the heavy hydrocarbon oil. This indicated the ease of the separation to maintain a relatively high purity of the recovered solvents or treating agents.

The foregoing data show that the method of this invention may be effectively employed to remove the solvent or solvent mixtures from admixtures thereof wtih inorganic solids and polymeric materials, if preesnt, obtained from known deashing procedures used to purify polyolefin products contaminated with undesirable metallic catalyst residues. By operating in accordance with the inventive method, inexpensive materials and uncomplicated equipment as well as a minimum number of steps can be successfully employed, thereby making a major contribution to the economics of the heretofore proposed deashing treatments. As used throughout this specification, the term "deashing" is considered to mean the removal of inorganic residues from polymers.

While particular embodiments of this invention are shown above, it will be understood that the invention is obviously subject to variations and modification without departing from its broader aspects. Thus, for example, means other than the incinerator shown in the drawing may be used to dispose of the contaminated hydrocarbon oil recovered from the bottom of flash separator 6, and the hydrocarbon oil may be heated to the desired temperature by means well known to the art.

What is claimed is:

1. In a method for deashing a solid polyolefin product containing solid metallic catalyst impurities, which comprises contacting said impure polyolefin product with a solvent comprising a hydroxyl-containing compound to extract said impurities, separating the thus treated solid polyolefin from the resulting solution containing the solvent and said impurities, and recovering the solvent from said solid impurities, the improvement which comprises concentrating said solution to about 45 to 60% by weight total solids by heating the solution to a temperature sufficient to volatilize a major proportion of said solvent, separating the volatilized solvent from the unvolatilized solution, contacting the unvolatilized solution with a hydrocarbon oil having a boiling point within the range of about 300° to 800° F. and which has been preheated to a temperature of about 300° to 700° F. to volatilize the remainder of the solvent, and separating the thus volatilized solvent from the hydrocarbon oil containing said solid impurities.

2. The method of claim 1 wherein the solid polyolefin is selected from the group consisting of polyethylene, polypropylene, and alpha olefin copolymers.

3. The method of claim 1 wherein the solid polyolefin is polypropylene and the solid metallic catalyst impurities are derived from an alkyl aluminum-titanium trihalide catalyst.

4. The method of claim 1 wherein the resulting solution also contains an inert hydrocarbon solvent.

References Cited by the Examiner

UNITED STATES PATENTS

| | | | |
| --- | --- | --- | --- |
| 1,744,421 | 1/1930 | Strund | 203—100 |
| 2,179,080 | 11/1939 | Alther | 203—100 X |
| 2,500,596 | 3/1950 | Adelson | 203—6.8 X |
| 2,570,066 | 10/1951 | Morrow | 203—69 |
| 2,868,848 | 1/1959 | Hennig | 203—100 X |
| 2,897,184 | 7/1959 | Kimble et al. | |
| 2,962,488 | 11/1960 | Horne | 260—94.7 |
| 3,030,348 | 4/1962 | Mills | 260—94.9 X |
| 3,039,940 | 6/1962 | Prinz et al. | 203—68 X |
| 3,138,579 | 6/1964 | Cabaness | 260—94.9 |

NORMAN YUDKOFF, *Primary Examiner.*

J. B. DONIHEE, D. EDWARDS, *Assistant Examiners.*